UNITED STATES PATENT OFFICE.

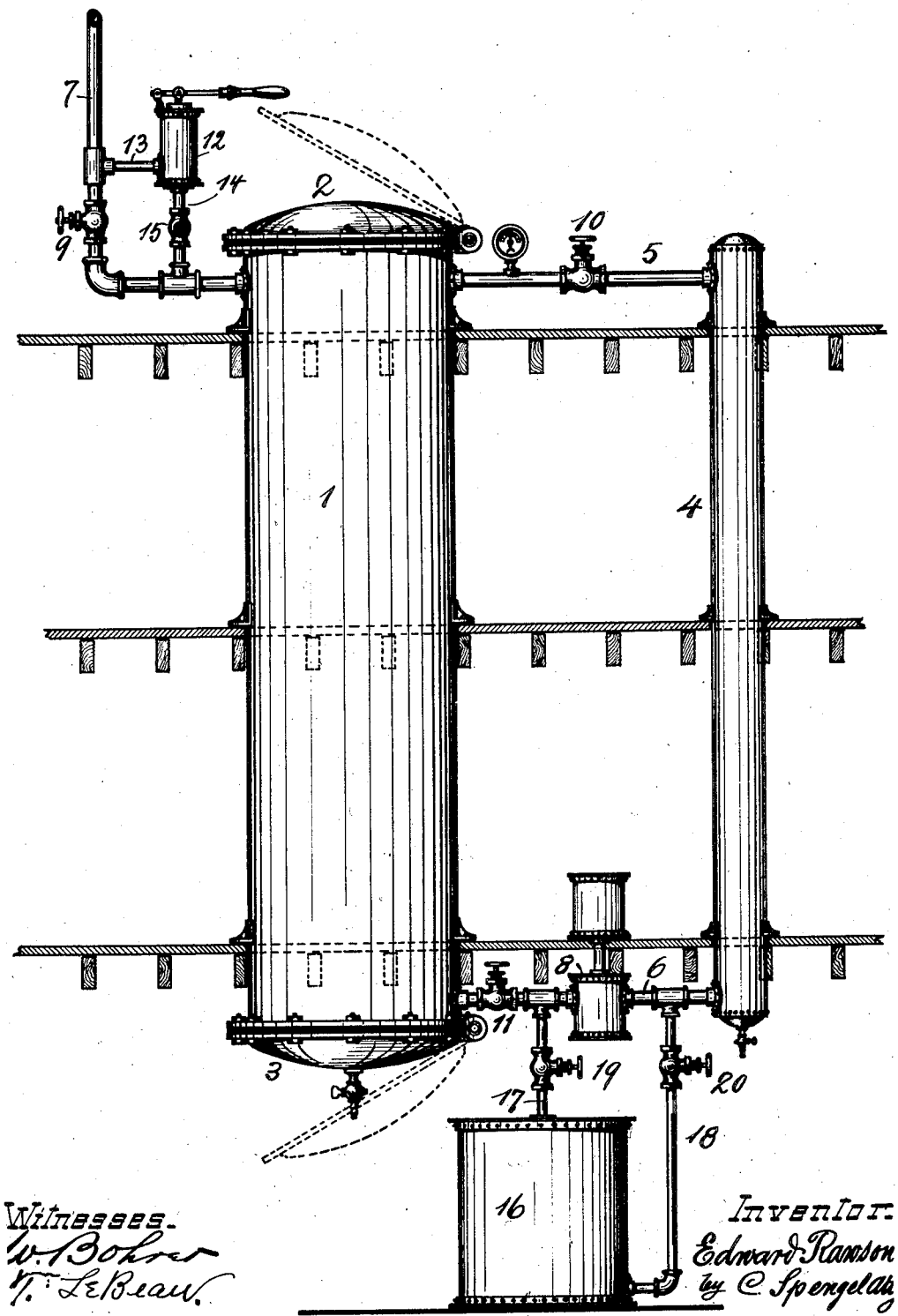

EDWARD RAWSON, OF CINCINNATI, OHIO.

APPARATUS FOR CURING MEAT.

1,070,531.

Specification of Letters Patent.     Patented Aug. 19, 1913.

Application filed July 20, 1912. Serial No. 710,558.

*To all whom it may concern:*

Be it known that I, EDWARD RAWSON, a citizen of the United States, and a resident of Cincinnati, Hamilton county, State of Ohio, have invented a certain new and useful Apparatus for Curing Meat; and I do declare the following to be a clear, full, and exact description of the invention, attention being called to the drawing which accompanies this application and forms a part thereof.

This invention concerns means and devices used in connection with the curing of meat products more particularly pork and where the treatment involves the use of a preserving or pickling liquor.

Under methods in vogue now, curing being effected by saturation with an absorbed pickling liquor, it requires from three to four months to reach the stage which permits smoking of the meat.

The aim of my invention is to shorten this time, so that curing may be accomplished in about one third of the time now required, giving at the same time better results. For such purpose and instead of relying merely upon absorption to obtain saturation of the meat with pickling liquor, I use hydraulic pressure to force the liquor into the cells of the meat and I also manipulate the liquor in a manner to produce a mechanically induced osmotic action whereby the natural juices of the meat, instead of being drawn out as for instance in the case of curing with dry salt or in processes involving the use of a vacuum, are retained and charged with the pickling liquor, so that both thoroughly incorporate one with the other, whereby the savor of the pickling liquor is caused to penetrate all parts of the meat. The method of treating such meat-products in this manner is more specifically described in my Patent No. 1,033,269, it consisting substantially of subjecting these products to the action of a pickling liquor while said liquor is caused to assume changed conditions as to pressure and movement. These conditions consist of a series of periods during which the liquor circulates with reference to the meat and which periods alternate with periods during which the liquor is at rest, the pressure of the liquor being changed during these latter periods.

The object of this invention is to provide an apparatus constructed in a certain manner to make the aforesaid manipulation possible and to permit the intended treatment to be carried out to the best possible advantage.

In the following specification and particularly pointed out in the claims at the end thereof, will be found a full description of my invention, together with its operation, parts and construction, which latter is also illustrated in the accompanying drawing, which shows my improved apparatus in a diagrammatical side view.

Numeral 1, in this view indicates a receptacle intended to receive the meat to be treated, hams for instance, and the curing liquor used in connection therewith. The size of this receptacle depends upon capacity of the establishment and since economy results from handling large lots at once, it should be arranged accordingly. A size permitting the handling of car-load lots, about 30,000 pounds, is advisable. Its strength should be sufficient to stand the pressures hereafter mentioned for which purpose a cylindrical tank-form is most desirable. Openings to permit charging and removal of the contents are provided and preferably obtained by leaving the ends of the tank open. By placing the same in an upright position meat may be charged into it from an upper floor and removal may be had on a lower floor. Caps are provided, one designated by 2, for the inlet-end, and another one 3, for the outlet-end and means are added whereby these caps may be securely closed.

4 designates a stand-pipe which communicates with the tank near both ends thereof by branches 5 and 6. It is intended to receive brine and serves as a supplementary receiver to tank 1.

7 designates a fill-pipe through which the curing liquor is supplied to the apparatus.

8 designates a circulating pump placed in a suitable position permitting it to be used for the purpose of moving the liquor within the apparatus, it being inserted for the purpose, or cut-in, in the lower branch 6.

Operations are started by filling the tank with meat and liquor, the former being placed carefully so as to prevent it from being bruised. The meat before being placed in the tank must be thoroughly chilled to the bone and hams and joints are "pumped" in the usual manner; that is pickle is injected with the needle into the shanks and butts of the hams, also into the fat of the same near the veil or diaphragm between fat and lean, also in the knuckle-joints, the object being to reach and charge the deeper situated cells and particularly those around the bone quicker than would otherwise be possible and for other reasons to be presently explained.

Sufficient liquor is supplied so as to fill the tank which is closed below, any surplus passing over into stand-pipe 4. Thereafter a valve 9 controlling supply-pipe 7 is closed and with fully open communication between tank 1 and pipe 4 at both branches 5 and 6, operation of pump 8 is started, whereby the pickle is caused to freely circulate upwardly through the tank and between the meat. By means of this circulation, maintained for from five to ten hours, equal treatment of all exterior surfaces is obtained and adherence of the hams to each other and discoloration is prevented. After this the operation of circulating pump 8 is stopped and valves 10 and 11, provided respectively in branches 5 and 6 are closed, cutting off the tank from the stand-pipe. Additional liquor is now forced into the completely closed tank until the pressure therein is raised to about 100 pounds, more or less. A force pump 12 is used for this purpose which is connected to the fill-pipe by means of branches 13 and 14 both arranged in a manner to by-pass valve 9, to render the action of said pump independent of control by valve 9. A check-valve 15, provided in branch 14 serves to hold the pressure, valve 9 remaining closed of course. This condition of pressure is maintained for hours, it may be during the night, after which the pressure is relieved by reestablishing communication with the stand-pipe and circulation is caused to resume by starting up pump 8. Another period of maintenance under pressure follows, obtained by action of the force-pump; the proper valves being manipulated as may now be readily understood. The curing of the meat may now be completed according to my method, or to one involving a substantially similar manipulation of the liquor and consisting of periods during which the liquor circulates, alternating with periods during which it is maintained under pressure, which pressure may be varied. These alternating changes in the pressure of the liquor cause the cells of the meat to alternately expand and contract, thus favoring a thorough saturation with the pickling liquor.

The previously mentioned preparatory injection of brine applied before the meat is placed in the tank, prevents meat juices from being driven into the deeper lying cells ahead of the pressure-forced brine and avoids formation of joint-water around the bones. Thus as will be seen, the action upon the meat cells and pores, to render them receptive to brine, is obtained by the purely mechanical pumping-action of the liquor which alternately opens and closes these cells and brings them in intimate contact with the brine without withdrawing the essential meat-juices. The liquor need only be of moderate strength and a mild salt and sugar pickle of not over 16 to 18 degrees salometer test produces the desired results.

The entire process is carried on in a closed conduit and no deterioration of the liquor results by exposure to air, or from contact with the inside of the tank which, by coating or otherwise, is arranged accordingly. The same liquor may be re-used for some time, any decrease being replenished by fresh liquor. The meat is removed through the lower end, cap 3 being gradually opened, the liquor having first been drawn off into a tank 16 by means of a pipe 17. In re-filling tank 1, the liquor from tank 16 may be used first, being raised by means of pump 8, through a pipe 18. Later during circulation said tank is preferably cut out, valves 19 and 20 being provided for the purpose. This tank may also be used to receive surplus liquor from tank 1 whenever the pressure therein is to be reduced during the circulation periods. The times given for the duration of the treatment depend somewhat on the size of the pieces and may be varied accordingly. In large establishments the process may be carried on continuously, a number of tanks being arranged in batteries which may be operated with one pumping outfit.

The arrangement and positioning of pipes, supply-tanks, valves, pumps, etc., may be varied more or less from that shown, since this is influenced to some extent by existing conditions as controlled by location of buildings, height of stories, etc.

Having described my invention, I claim as new:

1. An apparatus for curing meat consisting of a receiver adapted to contain meat and curing-liquor, stand-pipe forming a supplementary brine-receiver for the receiver first mentioned, branches for connecting the two near their ends, valves to control communication through these branches, a circulating pump connected to one of these branches and a force-pump in communication with the receiver first mentioned.

2. An apparatus for curing meat consisting of a receiver adapted to contain meat and curing-liquor, stand-pipe forming a supplementary brine receiver in controllable communication with the first receiver at both ends thereof, a tank in communication with both and means to manipulate the liquor so as to cause it to pass from one into the other and in and out of the connected parts.

3. An apparatus for curing meat which consists of a tank adapted to receive meat and curing-liquor, a charging-pipe for this tank, a force-pump in connection with this pipe, a stand-pipe in controllable communication with the tank at both ends thereof and means to cause the liquor in the tank to circulate through the tank and through the stand-pipe.

In testimony whereof, I hereunto affix my signature in the presence of two witnesses.

EDWARD RAWSON.

Witnesses:
C. SPENGEL,
T. LE BEAU.